March 1, 1927.

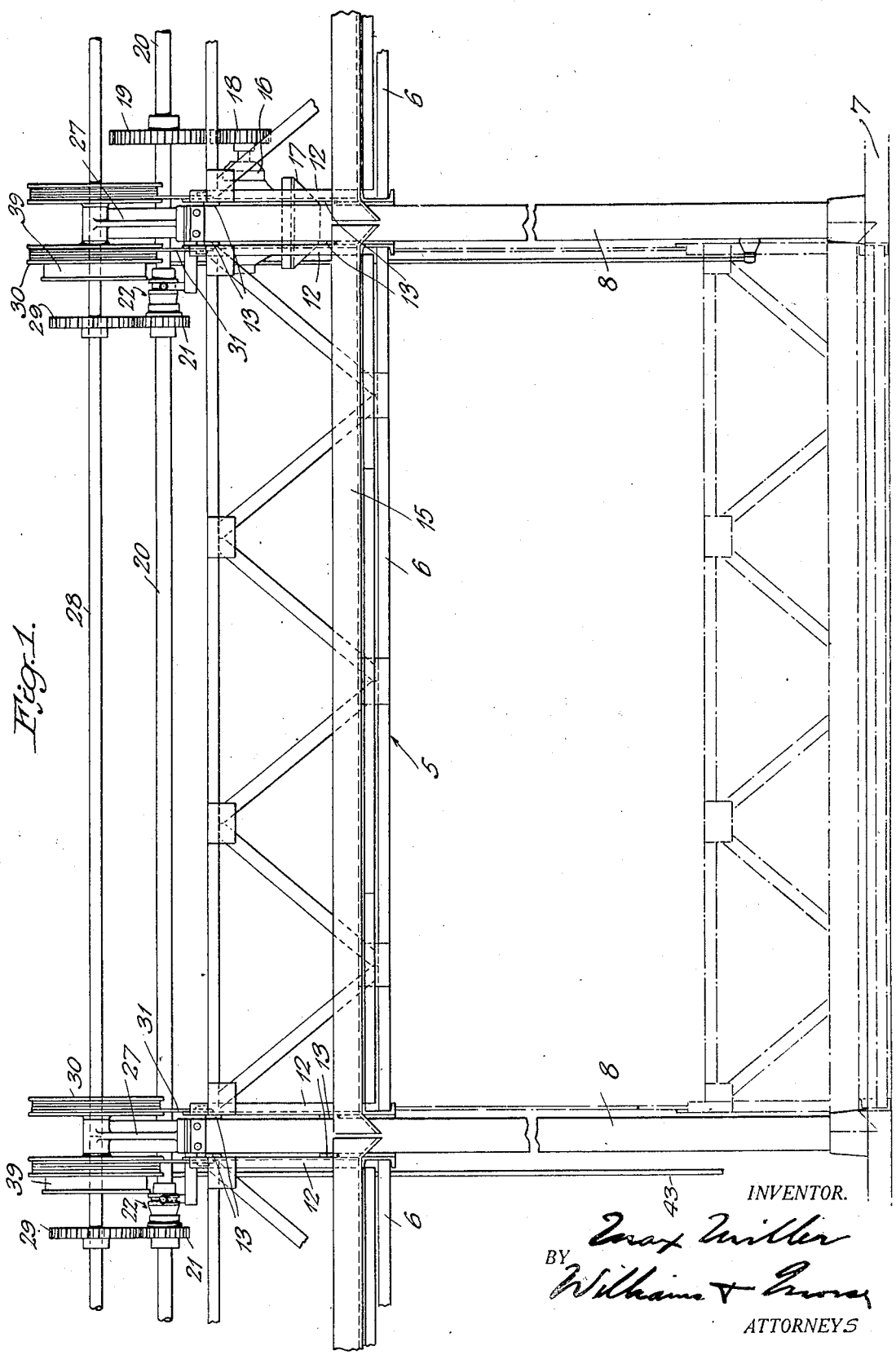

M. MILLER

VEHICLE PARKING SYSTEM

Filed March 21, 1925   3 Sheets-Sheet 2

1,619,360

INVENTOR
Max Miller
BY
William + Ennis
ATTORNEYS

March 1, 1927.  
M. MILLER  
VEHICLE PARKING SYSTEM  
Filed March 21, 1925   3 Sheets-Sheet 3
1,619,360
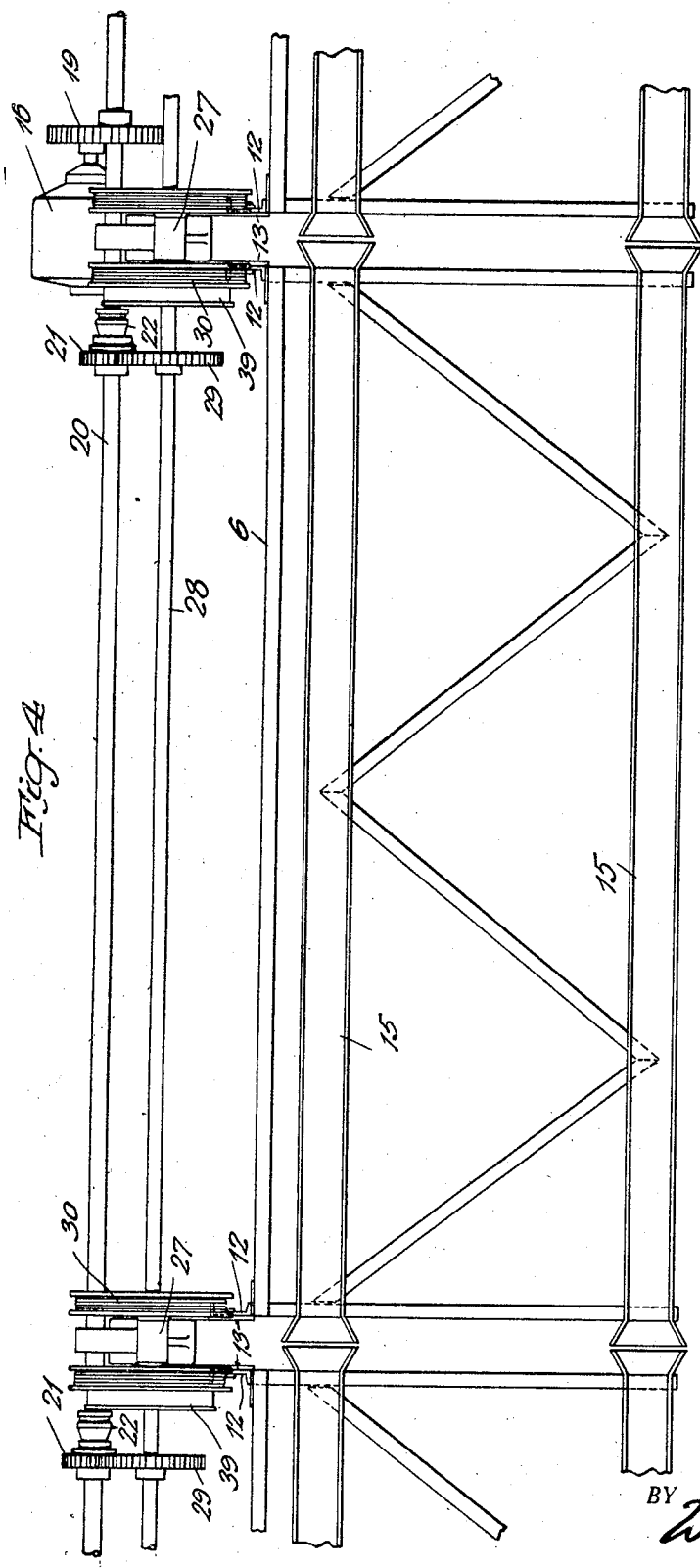
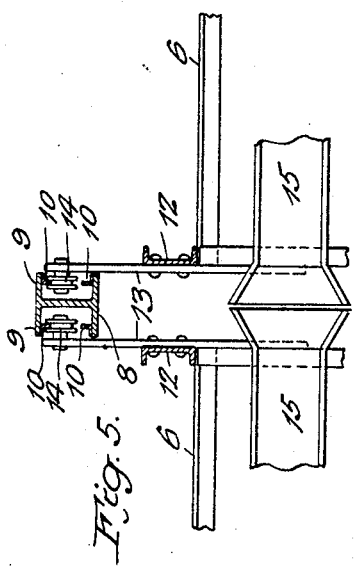
INVENTOR.  
BY  
ATTORNEYS Patented Mar. 1, 1927.

1,619,360

UNITED STATES PATENT OFFICE.

MAX MILLER, OF NEW YORK, N. Y.

VEHICLE PARKING SYSTEM.

Application filed March 21, 1925. Serial No. 17,453.

This invention relates to vehicle parking systems and has for one of its objects to provide, in combination with a roadway or other thoroughfare, a means for lifting such vehicles as automobiles from the highway to an elevated parking position thereover, thus leaving the roadway unobstructed.

Another object of the invention is to provide an improved elevator structure, by means of which the automobiles are lifted to elevated parking position, which is so constructed that an automobile may be moved into or out of elevated parking position without disturbing such other automobiles as are at a given instant maintained in their respective elevated positions.

Other objects and certain advantages of the invention will become apparent from the following description when taken in connection with the accompanying drawings in which—

Figure 1 is a front elevation of an elevator.

Figure 4 is a plan view of the elevator shown in Figure 1.

Figure 5 is a fragmental horizontal sectional view through one of the posts showing in detail a pair of tracks over which trucks of adjacent platforms are adapted to travel.

Figure 3:
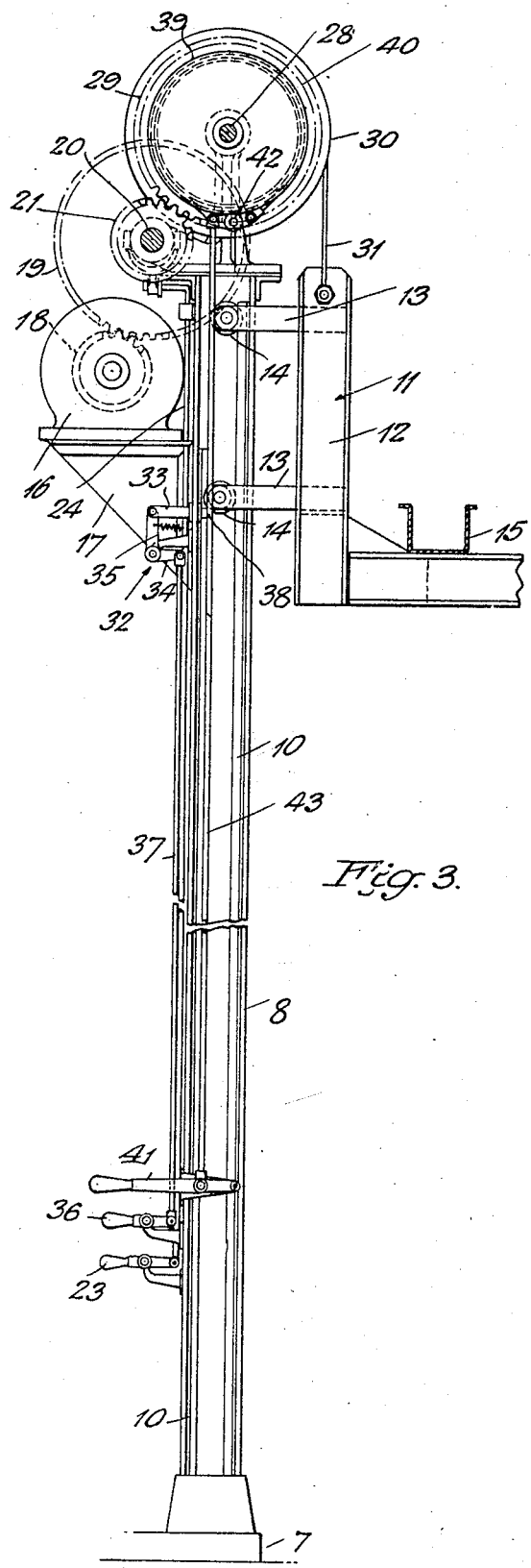
Figure 3 is a view of the structure shown in Figure 2 as viewed from the right therein.
Figure 2:
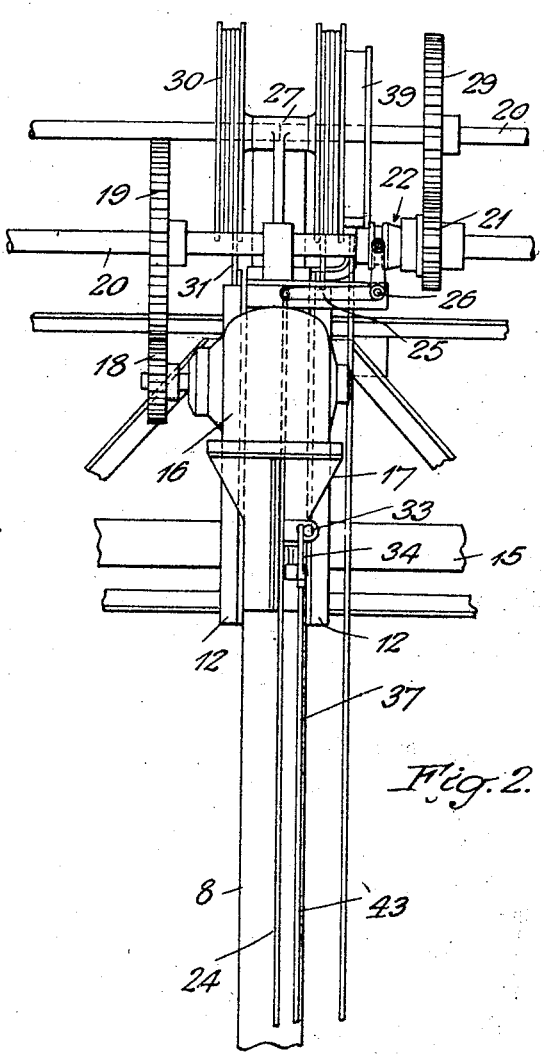
Figure 2 is a view in elevation showing in detail certain driving and control mechanisms.

Referring to the drawings, the numeral 5 indicates an elevator comprising a plurality of vertically movable platforms 6, each of which is adapted to be raised and lowered independently of the others by means of suitable mechanism hereafter more particularly described. This elevator structure is arranged at one side of a thoroughfare, as the curb 7 of a street and may be of any desired length extending throughout as many blocks as desired.

The elevator framework comprises a plurality of posts 8 spaced from each other a distance corresponding to the length of the individually movable platforms 6. These posts are of the H beam type shown most clearly in Figure 5, the opposite flanges 9 of the posts being provided with tracks or guide rails 10 upon which suitable trucks 11 are adapted to operate. The trucks comprise vertically disposed beams 12 to which are connected parallel arms 13 carrying rollers 14, adapted to engage and operate upon the tracks 10.

The platforms 6 are suitably connected to the trucks 11 and project outwardly from the posts 8 a sufficient distance to accommodate an automobile. In order to guide the the automobile on to the platform, suitable troughs 15 may be provided. These troughs extend longitudinally of the platforms 6 and are at opposite ends flared outwardly, as shown most clearly in Figure 4, to facilitate entrance of the automobile wheels.

As a means for lifting the several platforms I prefer to employ electric motors, one of such motors being indicated by the numeral 16. These motors may be placed at suitable intervals throughout the length of the elevator and are preferably supported upon shelf-like supports or ledges 17 connected to the posts 8. Each of the motors employed is connected by means of gears 18 and 19 to a longitudinally disposed shaft 20 of any desired length. This shaft is suitably journaled to the posts 8 and carries for each elevator section or platform 5 a loosely mounted gear 21 adapted to be locked to the shaft through the instrumentality of a suitable clutch 22. The clutch mechanism may be operated by a suitable control 23 mounted upon one of the posts 8 and connected to the clutch by means of a rod 24 and lever 25, the lever being adapted to swing about its pivotal point 26 when the handle 23 is moved in one direction or the other to lock the gear 21 to the shaft or disengage the same therefrom, as desired.

Upon the posts 8 are mounted bearings 27 within which are journaled a plurality of shafts 28, there being one shaft for each platform 6 that is employed. To each of the shafts 28 there is connected a gear 29 adapted at all times, to mesh with the gear 21. Each of the shafts 28 carries also a pair of drums 30, there being one pair of drums to each movable platform or section 6. To these drums are connected cables 31 which in turn are secured to the trucks 11. From the construction thus far described it will be appreciated that any one of the shafts 28 may be operatively connected to the master or drive shaft 20, thus causing a desired platform to be elevated to the exclusion of the others.

In order to effectively lock the platforms or sections 6 in their elevated positions after disconnecting the operative connection established between the shafts 20 and 28 through the instrumentality of the clutch 22, I employ suitable locks, one or more being used for each elevator section. One of these locks is indicated by the numeral 32 and shown in Figure 3. The lock comprises a dog 33 pivotally connected to a crank 34 which is adapted to be moved against the tension of a spring 35 by a lever 36 linked to the crank arm 34 by means of a rod 37. As the elevator is moved from its lowermost to its uppermost position the bevelled end 38 of the dog 33 rides over the arm 13 and is thereafter moved, under the influence of the spring 35, to the position shown in Figure 3, thus providing a means for positively locking the elevator section in its uppermost position. When it is desired to lower the elevator section the hand lever 36 is so moved as to retract the dog 33 thus allowing the elevator section 6 to descend.

In order, to control the elevator sections 6 in their downward movements I have provided one drum of each pair thereof with a brake drum 39 with which is associated a band brake 40. This band brake is adapted to be controlled through the instrumentality of a hand lever 41 pivotally connected to the post 8 and in turn connected to a contracting and expanding link 42 by means of a control rod 43. By moving the hand lever 41 in one direction the brake band 40 is contracted about the brake drum 39, as will be readily appreciated, whereas when the lever 41 is moved in an opposite direction the brake band 40 is expanded. By this means a suitable control may be had over each elevator section 6 from the time the same is released and starts on its downward travel until it has been brought to rest at the street level.

While I have shown the elevator structure located at only one side of the street or other highway it is obvious that if desired a similar elevator structure may be provided for the opposite side of the street thus affording parking facilities at each side of the highway. The type of elevator herein disclosed readily lends itself to application in the capacity herein described for the reason that the elevator sections 6 are of the cantilever type and are supported entirely from one side of the thoroughfare, as at the curb of a street, by means of posts so located as to offer no interference whatsoever to traffic.

In practice attendants may be employed and assigned to a group of platforms as operators for the individual sections. The office of these attendants will be to assign unoccupied elevator sections to drivers of automobiles desiring to park their machines. Upon assignment of a given section the section is lowered by the attendant to the street level by releasing the dog 33 whereupon the driver runs his automobile on to the section so lowered. After the passenger or passengers have been discharged from the automobile the attendant, operatively connects the shaft 20 to the shaft 28 through the instrumentality of the clutch 22 and gears 21 and 29, whereupon the platform 6, together with the automobile, is elevated to the position of the platform shown in Figure 3, the height of the platform being such as to permit the street or other traffic to readily pass thereunder.

While any ratio of gearing between the source of power and the several shafts 28 may be employed, I propose to maintain such ratios as will enable the several platforms to be elevated to their uppermost positions in a period of approximately thirty seconds so as to preclude the possibility of unduly obstructing traffic while the automobile is being lifted to its parking position.

Having thus described my invention what I claim is:

1. In a vehicle parking system, the combination with a roadway, of a movable platform adapted to receive a vehicle from the roadway, means located wholly at one side of the roadway for supporting said platform, means movably connecting said platform to said supporting means, and means for elevating said platform with the vehicle thereon to parking position over the roadway.

2. In a vehicle parking system, the combination with a roadway, of a vertically movable platform adapted to receive a vehicle from the roadway, supports for said platform located wholly at one side of the roadway, cantilever means for movably connecting said platform to said supports, and means for elevating said platform with the vehicle thereon to parking position over the roadway.

3. In a vehicle parking system, the combination with a roadway, of a vertically movable platform adapted to receive a vehicle from the roadway, supports for said platform located wholly at one side of the roadway, cantilever means for movably connecting said platform to said supports, operable means for elevating said platform with the vehicle thereon to parking position over the roadway, and means for controlling the operation of the latter named means.

4. In a vehicle parking system, the combination with a roadway, of a vertically movable platform adapted to receive a vehicle from the roadway, supports for said platform located wholly at one side of the roadway, cantilever means for movably connecting said platform to said supports, operable means for elevating said platform with the vehicle thereon to parking position over the roadway, means for controlling the operation of the latter named means, and means for locking said platform in elevated position.

5. In a vehicle parking system, the combination with a roadway, of a vertically movable platform adapted to receive a vehicle from the roadway, supports for said platform located wholly at one side of the roadway, cantilever means for movably connecting said platform to said supports, operable means for elevating said platform with the vehicle thereon to parking position over the roadway, means for controlling the operation of the latter named means, and braking means for controlling the movement of said platform from its elevated position to its lowermost position.

6. In a vehicle parking system, the combination with a roadway, of an elevator comprising a plurality of vertically movable platforms each of which is adapted to receive a vehicle from the roadway, means for elevating any one of said platforms with a vehicle thereon to parking position independently of the other of said platforms, supporting means for said platforms located wholly at one side of the roadway, and means for movably connecting said platforms to said supporting means.

7. In a vehicle parking system, the combination with a roadway, of an elevator comprising a plurality of vertically movable platforms each of which is adapted to receive a vehicle from the roadway, means for elevating any one of said platforms with a vehicle thereon to parking position independently of the other of said platforms, supporting means for said platforms located wholly at one side of the roadway, and cantilever means for slidably connecting said platforms to said supporting means.

8. In a vehicle parking system, the combination with a roadway, of an elevator comprising a plurality of vertically movable platforms each of which is adapted to receive a vehicle from the roadway, means for elevating any one of said platforms with a vehicle thereon to parking position independently of the other of said platforms, and means for controlling the movement of each platform from its elevated position to its lowermost position.

9. In a vehicle parking system, the combination with a roadway, of an elevator comprising a plurality of platforms each of which is adapted to receive a vehicle from the roadway a rotatable shaft common to all of said platforms, means for rotating said shaft, a group of shafts, elevating means connected to the shafts of said group and to the respective platforms, means for selectively connecting the shafts of said group to said rotatable shaft to move a given platform independently of the others to elevated position.

10. In a vehicle parking system, the combination with a roadway, of an elevator comprising a plurality of platforms each of which is adapted to receive a vehicle from the roadway a rotatable shaft common to all said platforms, means for rotating said shaft, a group of shafts, elevating means connected to the shafts of said group and to the respective platforms, means for selectively connecting the shafts of said group to said rotatable shaft to move a given platform independently of the others to elevated position, supporting means for said platforms located wholly at one side of the roadway, and cantilever means for slidably connecting said platforms to said supporting means.

In testimony whereof, I have affixed my signature to this specification.

MAX MILLER.